Dec. 9, 1930.  T. JENSEN  1,784,524
AUTOMOTIVE DRIVE
Filed March 19, 1926    4 Sheets-Sheet 1
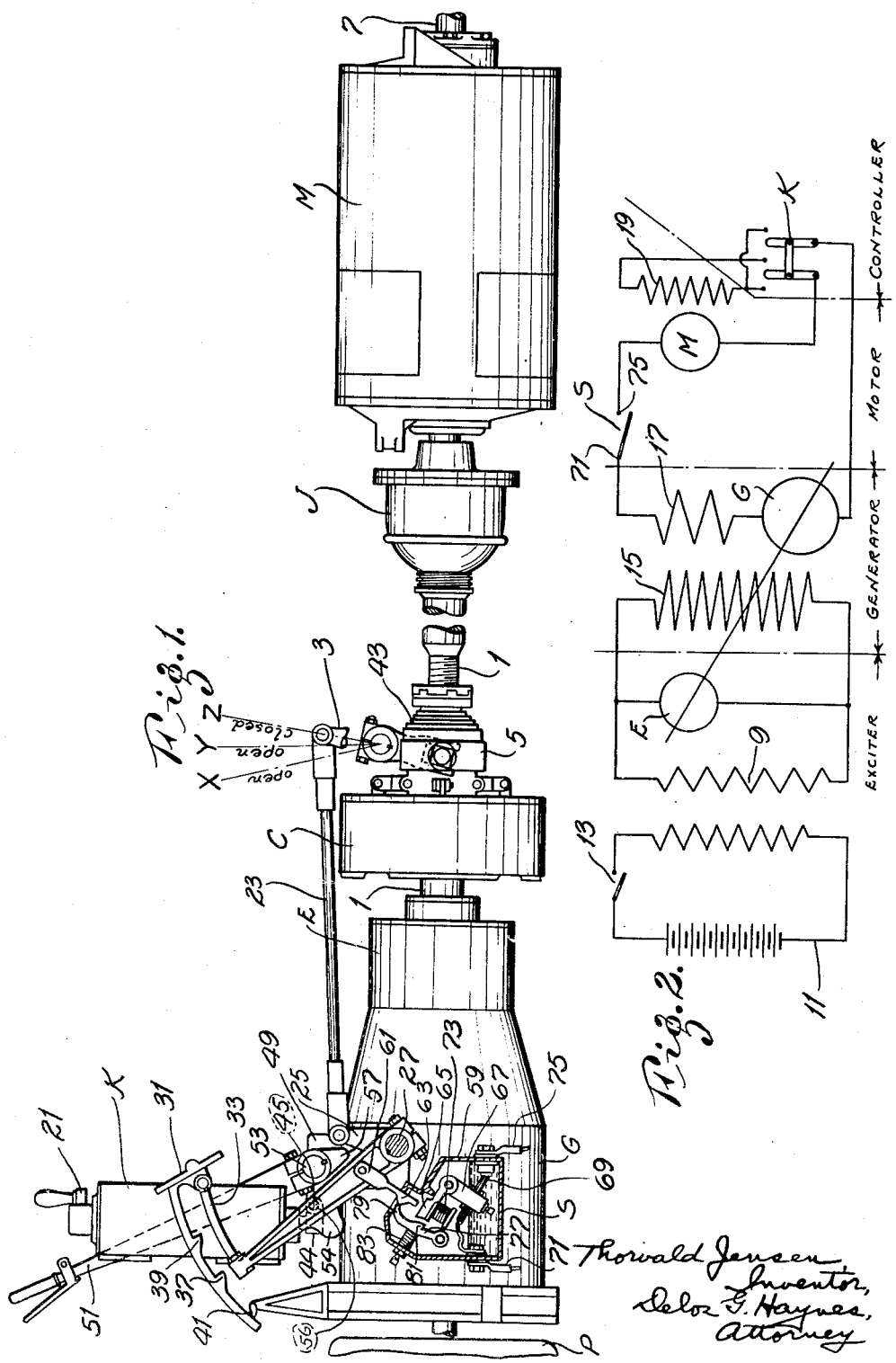

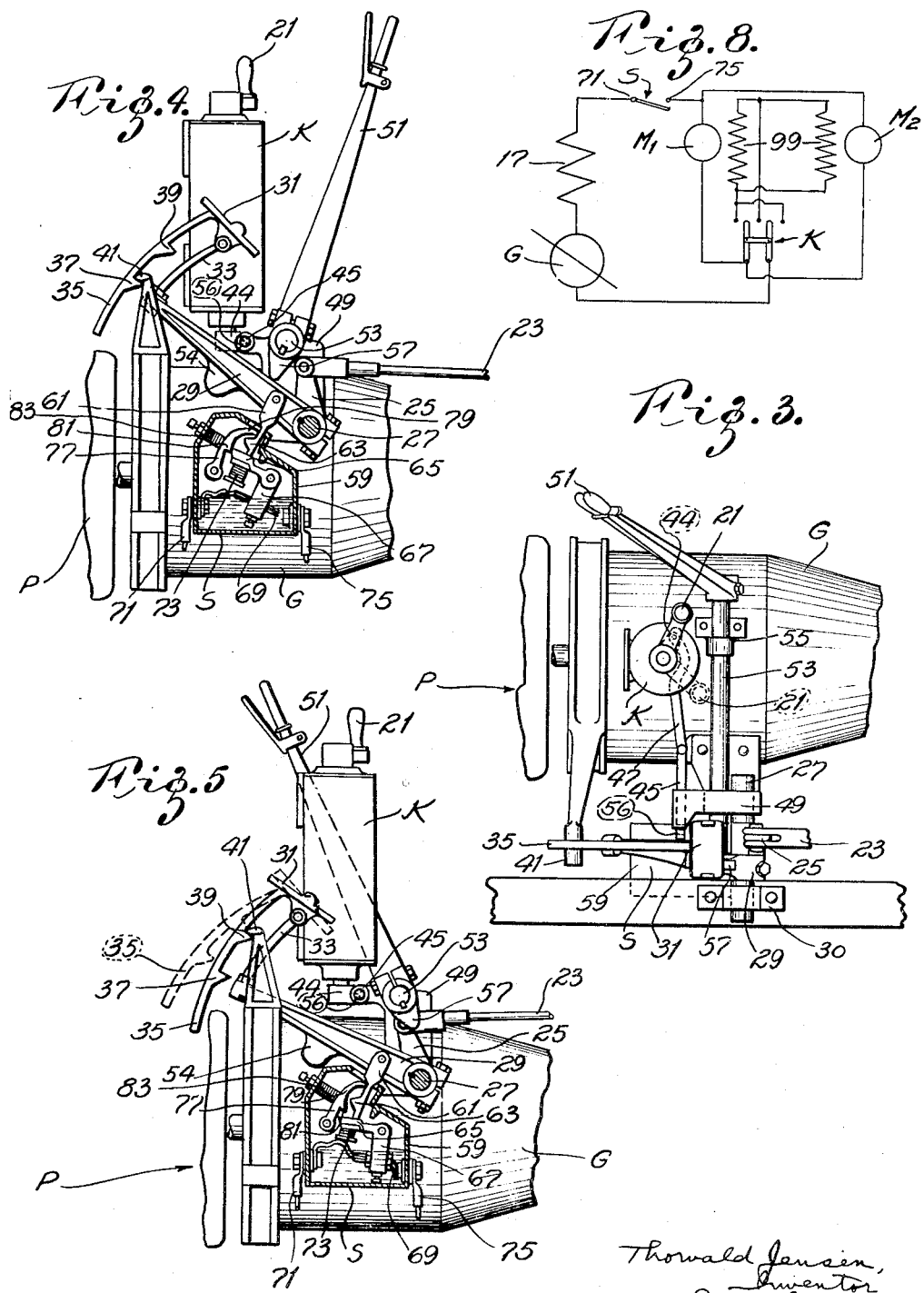

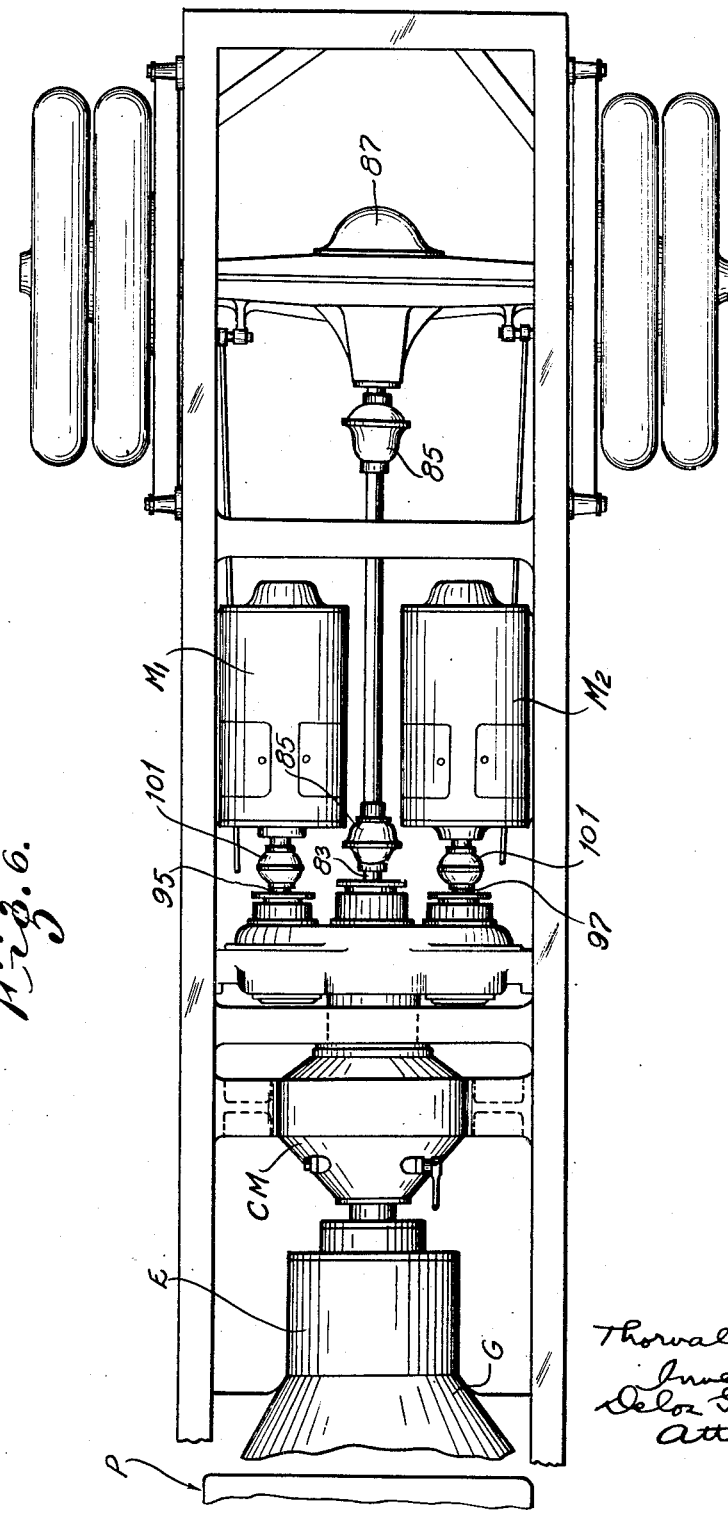

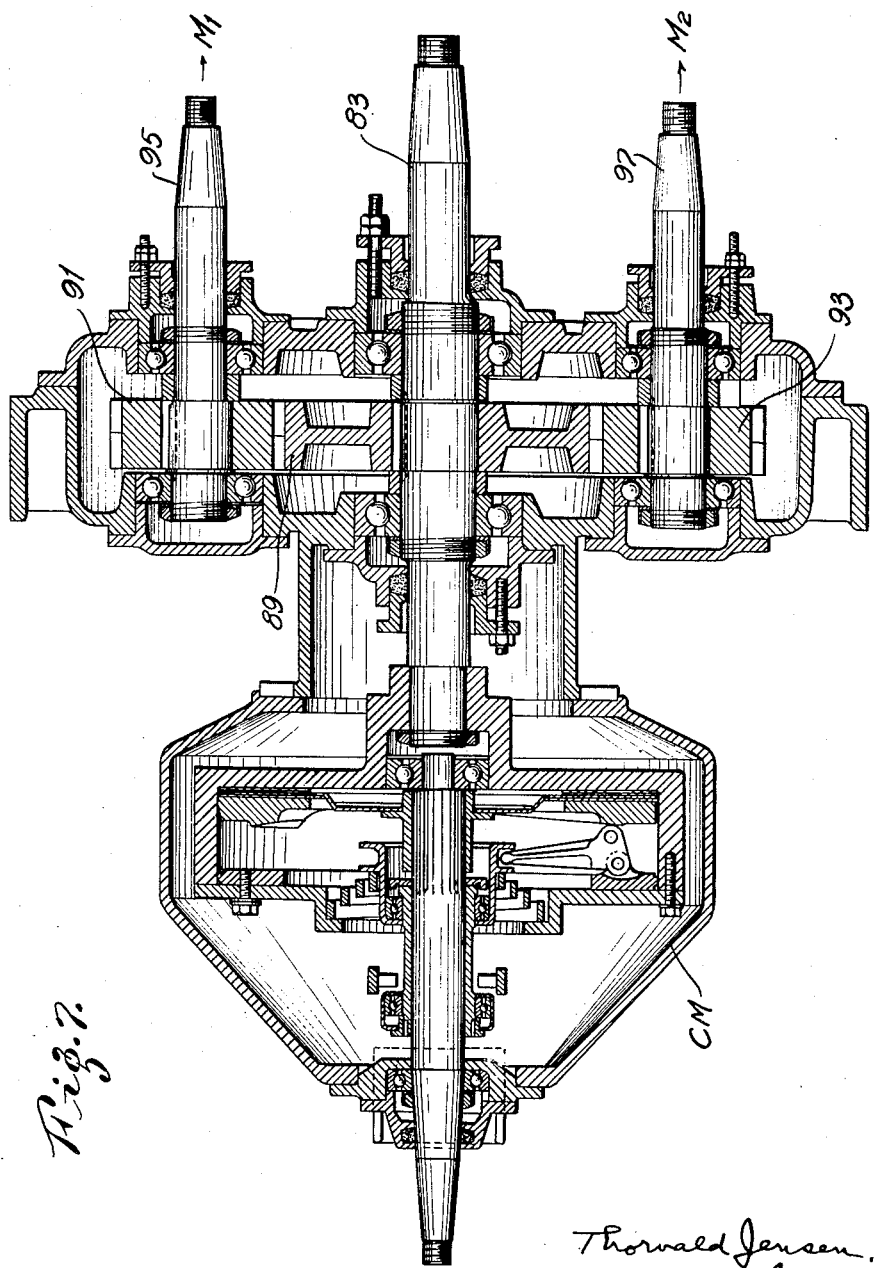

Patented Dec. 9, 1930

1,784,524

UNITED STATES PATENT OFFICE

THORVALD JENSEN, OF ST. LOUIS, MISSOURI, ASSIGNOR TO THE WINTHER COMPANY, OF WILMINGTON, DELAWARE, A CORPORATION OF DELAWARE

AUTOMOTIVE DRIVE

Application filed March 19, 1926. Serial No. 96,109.

This invention relates to automotive drives, and with regard to certain more specific features, to combined electrical and mechanical drives for automotive vehicles.

Among the several objects of the invention may be noted the provision of an improved, manual control for combined electrical and mechanical drives, whereby well defined reflex actions or motions of a driver are taken advantage of; the provision of interlocking safety means whereby possible mistakes of an operator are positively forestalled; and the provision of improved means for relating the power generators, motors, and direct mechanical drive elements in a drive of the class described. Other objects will be in part obvious and in part pointed out hereinafter.

The invention accordingly comprises the elements and combinations of elements, features of construction, and arrangement of parts which will be exemplified in the structure hereinafter described, and the scope of the application of which will be indicated in the following claims.

In the accompanying drawings in which are illustrated various possible embodiments of the invention, Fig. 1 is a fragmentary side elevation of one form of the drive showing the manual operating features in position for direct forward mechanical driving;

Fig. 2 is a wiring diagram which applies to Fig. 1;

Fig. 3 is a plan view of portions of Fig. 1;

Fig. 4 is a partial side elevation of the control parts of Fig. 3 showing a neutral position with emergency brakes set;

Fig. 5 is a view similar to Fig. 4 showing an electrical driving position;

Fig. 6 is a diagrammatic plan view showing an improved relationship of driving parts;

Fig. 7 is a horizontal section showing certain driving elements of Fig. 6; and

Fig. 8 is a fragmentary wiring diagram showing how Fig. 2 should be modified to make it applicable to the parts of Fig. 6.

Similar reference characters indicate corresponding parts throughout the several views of the drawings.

Referring now more particularly to Fig. 1, there is illustrated at G a generator adapted to be mounted in an automotive vehicle and to be mechanically driven by the prime mover P thereof. The generator G has an exciter unit E directly connected therewith for purposes of self exciting the generator. The generator G provides electrical energy to drive the motor M under certain conditions hereinafter to be described. It is also mechanically connected to the armature of said motor M by means of line shafting 1 into the line of which is connected a conventional clutch C and a packed universal joint J. The clutch is adapted to be opened and closed from a rocker arm 3 operating with a conventional throw-out mechanism 5. Hence the generator G may be mechanically connected to or disconnected from the armature of the motor M.

The armature of the motor is also mechanically connected to the wheel-driving system of the motor vehicle by means of a propeller shaft 7 and attendant parts. It is evident that when the clutch C is closed, the prime-mover P will furnish energy to the propeller shaft 7 by direct mechanical connection through the generator G, clutch C, and motor M. This action presupposes that the electrical connections between the generator G and the motor M are preferably open, whereby electrical energy flows from one machine to the other.

When the clutch C is open the electrical circuit between the generator G and motor M is adapted to be closed, as will be described. Hence the motor M is driven by electrical energy furnished by the generator G, and said motor M drives the propeller shaft 7 at a rate which is independent of a direct mechanical connection between the generator G and the motor M.

Fig. 2 illustrates the wired connections between the generator G and the motor M. Numeral 9 designates the exciter shunt field which is adapted to be incipiently excited from a conventional teaser circuit 11. The teaser circuit 11 is adapted to be closed for teasing purposes at a snap switch 13. The main generator shunt field is designated at the numeral 15, and the main generator series differential field at numeral 17. An interlocking switch S for opening the generator-motor circuit is provided. The motor field is indicated at the numeral 19 and is adapted to be reversed from the controller K. This is for the purpose of reversing the direction of the motor rotation independently of the generator rotation. The connections within the controller K which are adapted to reverse the motor fields 19 are of the conventional type and are diagrammatically illustrated in detail in Fig. 2.

The controller K as illustrated in Figs. 1, and 3 to 5 is of the drum type and is rotatably operable from a handle 21. The solid line position of the handle 21, illustrated in Fig. 3, is the one in which the controller is set for forward operation of the motor M, that is, as regards movement of the vehicle. Its dotted line position in said Fig. 3 illustrates the position for reverse operation of said motor M. The controller K is adapted to be operatively interlocked with other elements of the present invention. Its primary purpose is to reverse the motor fields and not to break the motor-generator circuit. Such circuit breaking is done primarily from the automatic switch S to be described.

The rocker arm 3 for operating the clutch throw-out 5, is operable by a drag link 23 to three positions, namely, X, Y and Z, shown in Fig. 1. The link 23 is pivoted to a crank arm 25 which is keyed to an oscillatory jack shaft 27. The shaft 27 also carries fast therewith a clutch pedal arm 29. This arm 29 carries a pivoted clutch pedal 31 on an extension 33 thereof.

The pedal 31 is provided with a ratchet extension 35 having teeth 37 and 39 adapted to engage a stationary pawl 41. The fact that the pedal 31 is pivotally mounted permits the operator to manipulate it to catch either or neither of the teeth 37 or 39 behind the pawl 41 to hold the clutch linkage in a predetermined position (see Fig. 5).

If the pedal 31 is manipulated so that it may spring back to its Fig. 1 position, that is, under return action of the clutch spring 43, then the rocker arm is in its position Z. This permits the clutch C to close for direct mechanical driving of the vehicle through the armature shaft of the motor M. When the pedal 31 is depressed and manipulated an amount and in a manner to catch the first tooth 37 behind the pawl 41 (that is, depressed about half way) then the arm 3 is in its position Y and the clutch C is adapted to open. Likewise, if the pedal 31 is further depressed and manipulated to catch the second tooth 39 behind the pawl 41, the arm 3 attains its position X and the clutch C is open. In either open position X or Y of the clutch C, the generator can not mechanically drive the motor M, and the vehicle, although it may do so electrically. It does drive the motor and vehicle mechanically when the clutch C is closed.

The controller K and the clutch throw-out mechanism are interlocked. This is done by providing a crank 44 on the lower end of the rotor of the controller K. This crank is connected to a slidable interlock rod 45 by means of a connecting rod 47. A bearing 49 slidably holds said rod 45 and supports said jack shaft 27. It also supports another shaft to be described. A second bearing 30 aids in supporting the shaft 27.

When the controller handle 21 is in its solid-line position for forward connections to the motor, then the interlock rod 45 is clear of the arm 29 and the clutch may be manipulated to all three of its said positions X, Y and Z. When, however, the lever 21 is in its dotted line reverse position, then the interlock rod 45 tends to intersect the plane of motion of the arm 29. The arm or lever 29 when in rearward clutch-closing position prevents movement of the interlock rod whereby the lever 21 cannot be thrown to reverse position. Hence there can be no attempt made to electrically reverse the motor M when it is in direct mechanical connection with the generator G.

However, had the pedal 31 been depressed to either of its clutch opening positions corresponding to positions X and Y of the rocker arm 3, then the controller handle 21 could have been set to reverse. This action would throw the interlock rod 45 in a position to prevent return of the clutch arm 29 to a clutch closing position corresponding to position Z of the arm 3. It is evident that it is impossible, with the described arrangement, for a driver to attempt to drive the machine forwardly mechanically and rearwardly electrically at one instant. Neither can he drop the clutch shut when the machines G and M are rotating in opposite directions; and act which might be disastrous to certain working parts of the drive. It may be noted that an ear 54 is formed with the arm 29 to provide a flat abutment for the interlock after wear takes place at the clutch and before consequent adjustments are made. A notch 56 is formed on the under side of the rod 45 for engaging the arm 29 when interlock position is had, whereby the operator is prevented from throwing the controller K to forward position from reverse position, when his foot is off the pedal 31.

It is to be understood that a vehicle employing the described system would employ a gas or like throttle as well as a foot brake (not shown). A conventional hand emergency brake lever 51 is employed to set the conventional emergency brakes by drawing the lever rearwardly (Fig. 4). It is fastened to a second jack shaft 53 held between a bearing 55 and said bearing 49. A cam 57 fastened to the shaft 53 is adapted to engage the arm 29 when the lever 51 is pulled rearwardly to braking position. Hence the arm 29 is set to its mid or neutral position illustrated in Fig. 4. The clutch is thus disengaged when the brakes are set for a standstill. When the brakes are released (Fig. 1) the cam disengages the arm 29 and said arm may take up a rearward position. The clutch C is then closed.

The switch S for opening and closing the motor circuit comprises a housing 59 located substantially beneath the lever 29. Pivoted to the arm 29 is a switch plunger 61 which has a nose 63 thereon. The plunger 61 reaches into the housing 59 and is adapted to engage a hardened latch 65. This latch 65 forms part of a bell-crank lever 67 which holds a switch brush 69. The brush 69 is flexibly connected to a terminal 71. A spring 73 tends normally to hold the lever 67 in such a manner that the brush 69 does not contact with a second terminal 75 (see Figs. 1 and 2).

At one side of the latch 65 is pivoted a holding pawl 77 having a nose 79 and a spur 81. The pawl is normally pressed by a spring 83 so that it engages the latch 65. However when the plunger nose 63 engages the pawl nose 79, then the spur 81 is held clear of the latch and the spring 73 holds the switch open.

The sequence of operations is as follows:

Fig. 1 shows the pawl 77 held out of engagement with the latch 65, by the cooperation of noses 63 and 79. Hence the switch is open. The pedal 31 is back and the clutch closed for direct driving. The controller K can not be set for reversing because of the interlocking between the arm 29 and rod 45. If before bringing the pedal 31 back, the controller had been set to reverse, then the pedal could not have returned to permit closing of the clutch. In the Fig. 1 position some clearance is had between the plunger 61 and the latch 65.

In Fig. 4 the pedal 31 has been pressed to what will hereinafter be called neutral position. The clutch is disengaged. The plunger 61 engages the latch 65 but not sufficiently to close the switch. The noses 63 and 79 are out of engagement and hence the spur 81 is ready to prevent return of the latch 65 after downward passage of said latch.

Fig. 5 illustrates the pedal 31 completely depressed to its low speed position. The plunger 61 has caused closing of the switch S and hence the motor M receives electrical energy from the generator G. The clutch C is open. The spur 81 is set ready to hold the switch closed.

Next, it is evident, that if the pedal 31 be permitted to return, then the switch will remain closed until the pedal is somewhat past neutral position, that is, until the noses 63 and 79 again substantially cooperate. When this cooperation does take place, then the spur 81 is taken from the latch 65 and the switch springs open quickly and positively without excessive arcing. Just after this event takes place the clutch closes to drive mechanically. A quantity of oil is kept in the housing 59 to cover the switch contact which, with the quick opening feature, prevents undue arcing.

Complete operation is as follows assuming the neutral positions of parts shown in Fig. 4.

To start the prime mover, a conventional means of starting is employed. The prime mover and generator G then rotate idly. The prime mover and generator G then rotate idly. The teaser field is temporarily closed to start excitation of the generator fields. The switch 3 and clutch G are both open so that no mechanical or electrical energy reaches the motor M and rear wheels to drive the car. The emergency brake lever 51 holds the parts in said neutral position.

To start the car forwardly, the driver places one foot (preferably the left one) on the pedal 31 while the brake lever 51 is set to release position (Fig. 5). Thereafter or simultaneously he presses the pedal 31 down to its Fig. 5 position. This electrically connects the generator and motor at the switch S, whereby the motor is driven by the generator to start the car if the prime mover is enough accelerated from the proper conventional gas throttle or the like. The clutch C is open. Hence the ideal electrical drive is had for starting conditions, by means of which the velocity of the car may be varied directly by varying the rate of rotation of the prime mover from the gas or like throttle. As in the case of any electric drive, the mechanical advantage between the prime mover and the driving wheels is automatically adjusted as speed increases and acceleration decreases. If the driver desires to proceed for some distance in this electrical or low gear he may hook the pedal 31 on the pawl 41. The electrical or low gear is of best service at starting, in plowing through soft or over rough ground and in climbing hills.

For higher speeds on long runs the electrical drive has been found to be wasteful of an appreciable amount of energy. Hence it is desirable to make use of the relatively more efficient mechanical drive at such higher speeds. Of course the electrical drive is also wasteful at starting and low speeds but for the short periods of such operation the gross loss is not appreciable. To shift into high mechanical speed the operator merely permits the pedal 31 to spring back into its Fig. 1 position. This has the effect of opening the switch S and permitting closing of the clutch C. Hence a direct mechanical drive is had from the prime mover P, through the generator G, closed clutch C, armature shaft of the motor M and to the driving wheels.

It should be noted that the switch S, in reopening had a delayed action because as the plunger 61 arose with the arm 29 the spur 81 caught the latch 65 to hold the switch shut. After the pedal 31 had somewhat passed its neutral position, that is, at a point at which the clutch C was about ready to close, the noses 63 and 79 cooperated to cause release of the switch. The purpose of this action is to provide a quick opening switch and to prevent the operator from "playing" the clutch pedal to cause an unnecessary series of arcs at the switch brush. Furthermore, it delays the cutting out of the electrical drive until the mechanical drive is just about ready to close, thereby preventing a perceptible jolt as the speeds are shifted. It should be understood however that if the interlock rod 45 blocks rearward movement of the arm 29, that the switch is adapted to be opened just before the arm 29, strikes the rod 45. Hence the driver can stop the car when reversing. Another way to stop is to throttle the prime mover without opening the switch S, until the amount of current flowing is not enough to move the car against the action of the brakes.

It is intended that the driver shall have a conventional pedal for setting the service brakes. It is then evident that the motions that he goes through for operating this combined electrical and mechanical drive are the same as are required for operating certain mechanical drives which are at present on the market. None of his reflex actions need be changed.

If, while the drive was in neutral position (Fig. 4) the driver had desired to reverse the coach, it would have only been necessary to throw the controller lever 21 to a reverse position before starting. Then by depressing the pedal 31, the electrical drive would have been thrown into connection for reverse movement. The generator G and the motor M would be rotating in opposite directions. However it would not be possible for the driver to permit the pedal 31 to come back to its high or mechanical driving position, because the interlock bar 49 would prevent this. It is generally understood that in automotive work high speed is not required in reverse, but the flexibility inherent in the electrical drive is desirable.

Whenever an emergency occurs during forward operation with the clutch closed, all that the driver needs to do is to pull the emergency brake lever 51 back, whereas the mechanical drive is thrown into neutral position and the brakes set. The electrical drive then assumes a neutral position. Under electrical driving conditions, the operator simultaneously with pulling back the lever 51, opens the electrical circuit by letting back the pedal 31. Under electrical driving conditions, the time element for emergency stopping is permissibly greater inasmuch as the vehicle speeds are lower.

It should be clearly noted that the advantages accruing to the above described control system do not depend upon the driving motor M being connected so that its armature shaft forms a part of the drive shaft of the vehicle as illustrated in Fig. 1. For instance, the motor elements may be connected as illustrated in Figs. 6 and 7. If desired, another motor M may be used in Fig. 1 having its armature formed on the shaft 7.

Referring now to Figs. 6 and 7 there is illustrated the prime mover B (Fig. 6) the generator G and exciter E direct connected to the driving elements of a modified clutch CM. The driven elements of the clutch CM are directly directed to a stub portion of the propeller shaft 83. Conventional joints 85 and differential gear 87 are used in the line of drive to the rear wheels. Fastened to the propeller shaft 83 is a herringbone gear 89 meshing with two herringbone pinions 91 and 93. The pinions 91 and 93 are held fast to the stub shafts 95 and 97 respectively of two driving motors $M_1$ and $M_2$ respectively. The said motors are mounted on the chassis. The motors rotate in the same direction, both because of the mechanical connection at the gear 89 and because of their electrical connections which are illustrated in Fig. 8.

Fig. 8 illustrates the fact that the motors $M_1$ and $M_2$ are connected in parallel as well as are their fields 99. The fields 99 may both be reversed at one movement of the controller K. It is evident that the control features hereinbefore described may be applied to the construction illustrated in Figs. 6 and 7, although the armatures of the motors $M_1$ and $M_2$ are not mounted on the drive shaft itself. It is evident that the features illustrated in Figs. 6 and 7 provide a more compact arrangement for a given plurality of motors. The number of motors may be increased above two by connecting in more spur gears on the gear 89. For instance more motors may be added above and/or below the structure illustrated.

Fig. 6 is intended to be a diagrammatic view and therefore does not repeat the detailed control structure illustrated in Figs. 1 and 3 to 5. Universal joints 101 are illustrated as being mounted between the motors $M_1$ and $M_2$ respectively and their stub shafts 95 and 97 respectively. The control features described may be used with either of the motor arrangements or either of the said motor arrangements may be employed without the described control features, insofar as it is possible to use other types of controls.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A vehicle drive comprising a prime mover, a generator connected therewith, a motor mechanically connected for driving the vehicle adapted to receive electrical energy from the generator, a mechanical connection between the generator and said mechanical connection of the motor, a clutch adapted to open the connection between the generator and said motor mechanical connection, means for opening and closing said clutch, a controller for reversing motor operation, an interlock between said controller and said clutch operating means adapted to prevent motor reversal when the clutch is closed and to prevent closing of the clutch after a motor reversal has been made and a switch for opening the motor-generator circuit, operated by said clutch operating means and adapted to close the circuit at a period when the clutch is open and open the circuit when the clutch is closed.

2. In a vehicle drive comprising a generator driven by a prime mover and electrically feeding a motor and connected with driving means, a mechanical connection between the generator and the driving means including a clutch, a switch in the motor-generator circuit, clutch operating means having a connection with said switch, the switch having an open position when the clutch is closed and a closed position when the clutch is open and a neutral open position when the clutch is in neutral open position and means for preventing the same time sequence of switch operation in opening the circuit and closing the clutch as is had in closing the circuit and opening the clutch.

3. In a vehicle drive comprising a generator driven by a prime mover and electrically feeding a motor and connected with driving means, a mechanical connection between the generator and the driving means including a clutch, a switch in the motor-generator circuit, clutch operating means having a connection with said switch, the switch having an open position when the clutch is closed and a closed position when the clutch is open and a neutral open position when the clutch is in neutral open position, means for preventing the same time sequence of switch operation in opening the circuit and closing the clutch as is had in closing the circuit and opening the clutch, and a controller for reversing motor operation interlocked with said clutch operating means whereby closing of the clutch is prevented during reverse operation of the motor and reverse operation of the motor is prevented when the clutch is closed.

4. In a vehicle drive comprising a generator driven by a prime mover and electrically feeding a motor and connected with driving means, a mechanical connection between the generator and the driving means including a clutch, a switch in the motor-generator circuit, clutch operating means having a connection with said switch, the switch having an open position when the clutch is closed and a closed position with the clutch in open position and a neutral open position when the clutch is in neutral open position, means for preventing the same time sequence of switch operation in opening the circuit and closing the clutch as is had in closing the circuit and opening the clutch, a controller for reversing motor operation interlocked with said clutch operating means whereby closing of the clutch is prevented during reverse operation of the motor and reverse operation of the motor is prevented when the clutch is closed and a brake mechanically connected with the clutch operating means for moving said clutch from closed position to neutral open position during brake application.

In testimony whereof, I have signed my name to this specification this 16th day of March, 1926.

THORVALD JENSEN.